United States Patent
Miller et al.

(10) Patent No.: US 10,452,133 B2
(45) Date of Patent: Oct. 22, 2019

(54) INTERACTING WITH AN ENVIRONMENT USING A PARENT DEVICE AND AT LEAST ONE COMPANION DEVICE

(71) Applicant: Microsoft Technology Licensing, LLC, Redmond, WA (US)

(72) Inventors: Quentin Simon Charles Miller, Sammamish, WA (US); Jeffrey Alan Kohler, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 15/375,195

(22) Filed: Dec. 12, 2016

(65) Prior Publication Data
US 2018/0164877 A1 Jun. 14, 2018

(51) Int. Cl.
*G06F 3/01* (2006.01)
*H04B 1/3827* (2015.01)
(Continued)

(52) U.S. Cl.
CPC ............ *G06F 3/012* (2013.01); *G02B 27/01* (2013.01); *G06F 3/011* (2013.01); *G06F 3/0304* (2013.01); *G06F 3/0346* (2013.01); *G06F 3/04815* (2013.01); *G06F 3/14* (2013.01); *G06T 11/60* (2013.01); *G06T 15/20* (2013.01); *H04B 1/3827* (2013.01); *H04L 67/10* (2013.01); *G06T 2219/024* (2013.01); *H04W 4/80* (2018.02); *H04W 84/12* (2013.01)

(58) Field of Classification Search
None
See application file for complete search history.

(56) References Cited

U.S. PATENT DOCUMENTS 8,217,995 B2 7/2012 Dobbins et al.
9,122,321 B2 9/2015 Perez et al.
(Continued)

FOREIGN PATENT DOCUMENTS

WO 2015048890 A1 4/2015

OTHER PUBLICATIONS

Rizaev, Adel, "Mixed Reality on Mobile Devices," available at <<https://diuf.unifr.ch/main/diva/sites/diuf.unifr.ch.main.diva/files/SeminarMobileDevices_Adel_Rizaev.pdf>>, retrieved on May 25, 2016, in Msc Research Seminar Multimodal Interaction on Mobile Devices, 2012, DIVA Group University of Fribourg, 4 pages.
(Continued)

*Primary Examiner* — Stephen T. Reed
(74) *Attorney, Agent, or Firm* — Rainier Patents, P.S.

(57) ABSTRACT

A technique is described herein for using a parent computing device and at least one companion computing device to simultaneously interact with an environment. In one implementation, the parent computing device progressively builds parent map information through its interaction with the environment. The technique leverages the parent map information to identify a current pose of the companion computing device. In one case, for instance, the parent computing device sends the parent map information to the companion computing device, and the companion computing device determines its current pose based on the parent map information in conjunction with sensor information collected by the companion computing device.

20 Claims, 11 Drawing Sheets

(51) Int. Cl.

| | | |
|---|---|---|
| *H04L 29/08* | (2006.01) | |
| *G06F 3/14* | (2006.01) | |
| *G06T 11/60* | (2006.01) | |
| *G06F 3/03* | (2006.01) | |
| *G06F 3/0481* | (2013.01) | |
| *G06T 15/20* | (2011.01) | |
| *G06F 3/0346* | (2013.01) | |
| *H04W 84/12* | (2009.01) | |
| *H04W 4/80* | (2018.01) | |
| *G02B 27/01* | (2006.01) | |

(56) References Cited

U.S. PATENT DOCUMENTS

| | | | |
|---|---|---|---|
| 9,303,999 B2 | 4/2016 | Hesch et al. | |
| 2010/0079356 A1 | 4/2010 | Hoellwarth | |
| 2012/0306850 A1 | 12/2012 | Balan et al. | |
| 2013/0147686 A1 | 6/2013 | Clavin et al. | |
| 2013/0293468 A1* | 11/2013 | Perez | G06F 3/033 345/158 |
| 2014/0002444 A1* | 1/2014 | Bennett | G06F 3/012 345/419 |
| 2014/0152558 A1 | 6/2014 | Salter et al. | |
| 2014/0160001 A1 | 6/2014 | Kinnebrew et al. | |
| 2014/0267234 A1* | 9/2014 | Hook | H04W 4/02 345/419 |
| 2014/0341465 A1 | 11/2014 | Li et al. | |
| 2014/0354685 A1* | 12/2014 | Lazarow | G02B 27/0172 345/633 |
| 2014/0368537 A1 | 12/2014 | Salter et al. | |
| 2015/0123966 A1 | 5/2015 | Newman | |
| 2015/0235099 A1 | 8/2015 | Lee et al. | |
| 2015/0348327 A1* | 12/2015 | Zalewski | G06F 3/01 345/419 |
| 2016/0027218 A1 | 1/2016 | Salter et al. | |
| 2016/0210780 A1 | 7/2016 | Paulovich et al. | |

OTHER PUBLICATIONS

Shi, et al., "Good Features to Track," in Proceedings of the IEEE Computer Society Conference on Computer Vision and Pattern Recognition, 1994, 10 pages.

Durrant-Whyte, et al., "Simultaneous Localisation and Mapping (SLAM): Part I The Essential Algorithms," in IEEE Robotics & Automation Magazine, vol. 13, No. 2, Jul. 2006, 9 pages.

Bailey, et al., "Simultaneous Localization and Mapping (SLAM): Part II," in IEEE Robotics & Automation Magazine, vol. 13, No. 3, Sep. 2006, 10 pages.

Davidson, et al., "MonoSLAM: Real-Time Single Camera SLAM," in IEEE Transactions on Pattern Analysis and Machine Intelligence, vol. 29, No. 6, Jun. 2007, 16 pages.

Watt, Allen, 3D Computer Graphics, Addison-Wesley, 3rd edition, Dec. 1999, Amazon.com product page only, available at <<https://www.amazon.com/>>, accessed on Nov. 28, 2016, 8 pages.

Aukstakalinis, Steve, Practical Augmented Reality: A Guide to the Technologies, Addison-Wesley Professional, 1st edition, Sep. 18, 2016, Amazon.com product page only, available at <<https://www.amazon.com>>, accessed on Nov. 28, 2016, 8 pages.

Martin, et al., "Decoupled Mapping and Localization for Augmented Reality on a Mobile Phone," in IEEE Virtual Reality, IEEE VR'14, Mar. 2014, 3 pages.

Klein, et al., "Parallel Tracking and Mapping for Small AR Workspaces," in Proceedings of the 2007 6th IEEE and ACM International Symposium on Mixed and Augmented Reality, 2007, 10 pages.

Wang, et al., "D-SLAM: Decoupled Localization and Mapping for Autonomous Robots," in Robotics Research, Springer Berlin Heidelberg, 2007, 11 pages.

León, et al., "SLAM and Map Merging," in Journal of Physical Agents, vol. 3, No. 1, Jan. 2009, 11 pages.

"Simultaneous localization and mapping," available at <<https://en.wikipedia.org/wikiSimultaneous_localization_and_mapping>>, Wikipedia online encyclopedia article, accessed on Nov. 6, 2016, 7 pages.

"International Search Report and Written Opinion Issued in PCT Application No. PCT/US2017/064980", dated Mar. 21, 2018, 10 Pages.

\* cited by examiner

INTERACTING WITH AN ENVIRONMENT USING A PARENT DEVICE AND AT LEAST ONE COMPANION DEVICE

BACKGROUND

Attempts have been made to expand the kinds of devices that can host mixed reality experiences, e.g., beyond traditional head-mounted displays (HMDs). For instance, attempts have been made to provide mixed reality experiences using handheld devices, such as smartphones and tablets. However, these kinds of handheld devices typically have relatively modest environment-sensing and processing capabilities; these limited resources, in turn, place constraints on the complexity and richness of the user experience that these devices can viably support. One way to address this issue is by adding sensors and processing resources to the handheld devices. But this strategy may increase the cost of the devices, and may potentially interfere with the ability of the devices to perform their original assigned tasks.

A similar consideration may affect other areas of technology that involve interaction with an environment, such as mobile robots, drones, etc.

SUMMARY

According to one aspect, a technique is described herein for using a parent computing device and at least one companion computing device to simultaneously interact with an environment. In one implementation, the parent computing device progressively builds parent map information through its interaction with the environment. The technique leverages the parent map information to identify a current pose of the companion computing device.

For instance, in one mode of operation, the parent computing device passes the parent map information to the companion computing device. The companion computing device then tracks its own movement within the environment with reference to the parent map information. The companion computing device may thereby forgo the task of generating its own native map information.

In another mode of operation, the companion computing device hosts its own companion map-building component which builds companion map information. The companion computing device can pass the companion map information to the parent computing device. The parent computing device integrates the companion map information with its own parent map information. The companion computing device can perform a reciprocal operation of updating its companion map information in response to a new instance of parent map information received from the parent computing device.

In another mode of operation, the companion computing device can pass companion image information and/or companion movement information (which are collected by the companion computing device) to the parent computing device. The parent computing device can use this forwarded information to identify the current pose of the companion computing device.

Various application scenarios can leverage the above technique. In one such scenario, the parent computing device can project a virtual object to a parent user from a vantage point of a current pose of the parent computing device. The companion computing device can project the same virtual object to the same user or a different user, but from the vantage point of a current pose of the companion computing device. Both projection operations rely on the same parent map information, associated with the same world coordinate system. In a variant of this scenario, the technique can allow the user of the companion computing device to interact with the virtual object, thereby affecting the state of the virtual object.

The technique has various technical merits. For instance, the technique allows a companion computing device having limited sensing and/or processing resources to perform complex functions that involve interaction with an environment. The technique does so by allowing the companion computing device to offload at least some complex processing tasks (such as building a map) to the parent computing device. From the opposite perspective, the parent computing device can improve its operation through its cooperative interaction with companion computing device, e.g., by generating more robust parent map information.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
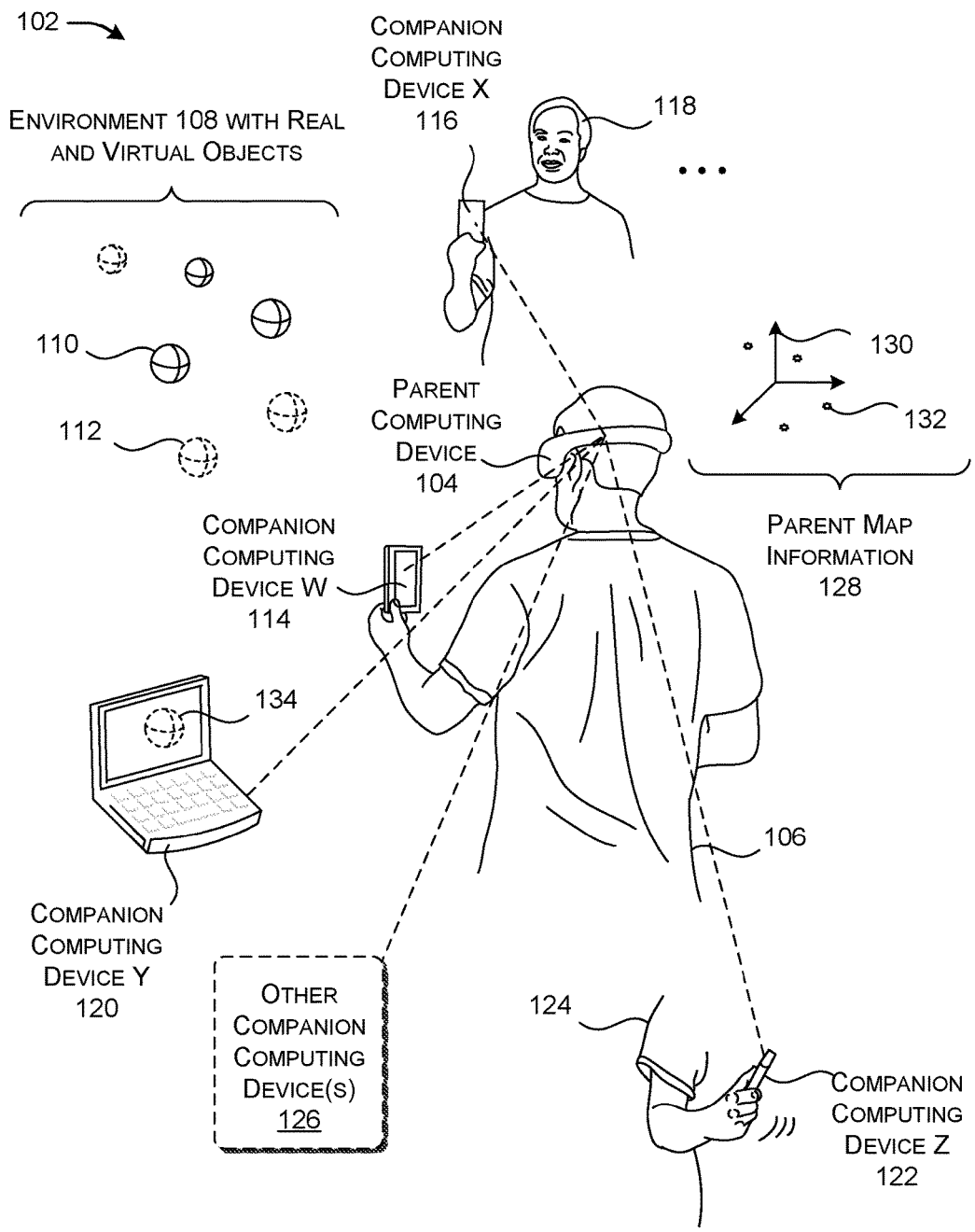
FIG. 1 shows a high-level overview of a system in which a parent computing device interacts with at least one companion computing device to perform at least one function, such as by providing a mixed reality experience to one or more users.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a system for interacting with an environment using a parent computing device and at least one companion computing device. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or other logic hardware (e.g., FPGAs), etc., or any combination thereof.

As to terminology, the phrase "configured to" encompasses various physical and tangible mechanisms for performing an identified operation. The mechanisms can be configured to perform an operation using, for instance, software running on computer equipment, or other logic hardware (e.g., FPGAs), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, or other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview of the System

FIG. 1 shows a system 102 in which a parent computing device 104 acts in cooperation with one or more companion computing devices to perform at least one function. In one implementation, the parent computing device 104 corresponds to a head-mounted display (HMD) worn by a parent user 106. In that illustrative context, the parent computing device 104 can include a collection of sensors for sensing a physical environment 108 within which the parent user 106 operates. That environment 108 includes a collection of physical objects, such as representative physical object 110. The parent computing device 104 also includes presentation equipment for presenting virtual objects to the parent user 106, such as representative virtual object 112. In a mixed reality scenario, the parent computing device 104 overlays the virtual objects on a representation of the real physical objects within the environment 108, at appropriate respective positions. The parent computing device 104 gives the overall effect that the environment 108 is populated with both real objects and virtual objects. In one implementation, the parent computing device 104 can include the type of environment-sensing and display devices described in, for instance, U.S. application Ser. No. 14/600,856 to Paulovich, et al., filed on Jan. 20, 2015.

In other implementations, the parent computing device 104 represents a kind of device other than a head-mounted display. For instance, the parent computing device 104 can corresponds to a stationary personal computing device, a handheld computing device (e.g., a tablet device or a smartphone, etc.), a game console, a set-top box device, another kind of wearable computing device (besides an HMD), a vehicle-mounted computing device, a robot-mounted computing device, a drone-mounted computing device, and so on, or any combination thereof. Or the parent computing device 104 can correspond to a piece of custom equipment that is specifically designed to work in conjunction with a particular application or to otherwise serve a particular purpose.

Generally, the parent computing device 104 has a first set of resources for use in performing its functions, while each companion computing device has a second set of resources for use in performing its functions. In many cases, the first set of resources is greater, e.g., more robust, compared to the second set of resources. For instance, the parent computing device 104 can include more sensing mechanisms (and/or more robust sensing mechanisms) compared to the sensing mechanisms provided by each companion computing device. Alternatively, or in addition, the parent computing device 104 can provide a more powerful computing platform compared to each companion computing device. For instance, the parent computing device 104 can provide more processing devices (and/or more powerful processing devices) compared to each companion computing device. Alternatively, or in addition, the parent computing device 104 can provide more memory compared to each companion computing device, and so on.

But in other cases, the parent computing device 104 can have similar capabilities to at least one companion computing device. In yet other cases, the parent computing device 104 can have inferior capabilities to at least one companion computing device, with respect to at least one dimension of device capabilities.

The companion computing devices can correspond to any type of computing equipment. For instance, any companion computing device can correspond to a stationary personal computing device, a laptop computing device, any kind of handheld computing device (such as a tablet device, a smartphone, etc.), a wearable computing device of any type, a game console, a vehicle-mounted computing device, a robot-mounted computing device, a drone-mounted computing device, etc. Or any companion computing device can correspond to a piece of custom equipment that is specifically designed to work in conjunction with a particular application or to otherwise serve a particular purpose. For instance, a companion computing device can correspond to a controller that is specifically designed to work in conjunction with the parent computing device 104, e.g., where the parent computing device may correspond to an HMD.

In the merely illustrative case of FIG. 1, a first companion computing device W 114 corresponds to any type of handheld computing device, such as a smartphone. The parent user 106 operates this companion computing device W 114. A second companion computing device X 116 likewise corresponds to any type of handheld computing device, such as a smartphone. A companion user 118 (who is a different person than the parent user 106) operates this companion computing device X 116. A third companion computing device Y 120 corresponds to a stationary personal computing device or a mobile computing device, such as a laptop. The parent user 106 or some other user may control this companion computing device Y 120. A fourth companion computing device Z 122 corresponds to a custom controller. The parent user 106 or some other companion user 124 operates this companion computing device Z 122. More generally, the system 102 can include any one or more of these companion computing devices (114, 116, 120, 122), and/or some other type of companion computing device. FIG. 1 illustrates this point by showing an element 126 bearing the generic label, "other companion computing device(s)."

As will be described below, the parent computing device 104 operates by generating parent map information 128. The parent map information 128 represents the environment 108 with reference to a world coordinate system 130. Further, the parent map information 128 describes the environment 108 using a collection of detected features associated with the environment 108, such as representative feature 132. Typically, the features correspond to prominent landmarks in the parent image information captured by the parent computing device 104, such as edge points, corner points, etc.

As a general principle, each companion computing device (114, 116, 120, 122, 126, etc.) relies on parent map information 128 generated by the parent computing device 104, and operates with reference to the same world coordinate system 130 associated with the parent map information 128. In other words, each companion computing device parasitically utilizes the parent map information 128. This reliance assumes different forms with respect to different respective use scenarios. Four such general scenarios are described below.

Use Scenario 1. Consider the case in which the companion user 118 manipulates the companion computing device X 116 within the same physical environment 108 as the parent user 106. In one implementation, the companion computing device X 116 receives the parent map information 128 from the parent computing device 104 on a periodic and/or event-driven basis. The companion computing device X 116 then proceeds to track the pose of the companion computing device X 116 within the environment 108 based on the parent map information 128. In this scenario, the companion computing device X 116 is freed from the responsibility of generating its own native map information that depicts the environment 108. As used herein, the term "pose" is an inclusive term that refers to the x, y, and z position of a computing device and its orientation (which can be expressed in terms of pitch, yaw, and roll). In other words, in some implementations, pose is expressed in six degrees of freedom.

Different applications can leverage the scenario described above. In one case, an application running on (or otherwise accessible to) the parent computing device 104 can present at least one virtual object for viewing by the parent user 106, from the perspective of the current pose of the parent computing device 104. A counterpart application running on (or otherwise accessible to) the companion computing device X 116 can present the same virtual object for viewing by the companion user 118, from a vantage point of the current pose of the companion computing device 116. In this manner, both the parent user 106 and the companion user 118 can observe the same mixed reality (or entirely virtual) scene, but from different perspectives.

In one instance of the above scenario, the parent user 106 is authorized to interact with the application to control the scene, but the companion user 118 is not given the same authority. Hence, the companion user 118 acts as a passive observer of that scene, although the companion user 118 is free to maneuver the companion computing device X 116 in any manner to view any portion of the scene. In other words, the companion user 118 can manipulate the companion computing device X 116 to view a different portion of the scene compared to that portion that is currently being viewed by the parent user 106.

In another instance of the above scenario, both the parent user 106 and the companion user 118 are given the authority to modify the scene. This allows either the parent user 106 or the companion user 118 to manipulate a virtual object in the scene, thereby changing its state. When the companion user 118 acts on a virtual object, the parent user 106 can observe the effects of this action, and vice versa. This mode of operation accommodates different application scenarios. For example, in a game scenario, the virtual object may correspond to a character in a combat-related game. Both the parent user 106 and the companion user 118 can interact with that character. In another scenario, the parent user 106 may control a first character in a scene, while the companion user 118 may control a second character in the scene.

In a related use scenario, the parent computing device 104 can interact with a first application which projects a mixed reality scene, while the companion computing device X 116 can interact with a second application which projects a different mixed reality scene. For example, the parent computing device 104 can project labels into a scene using a first labeling application, in a first language. The companion computing device X 116 can project labels into a scene using a second labeling application, in a second language. The system 102 can be configured such that the parent user 106 can selectively either see or not see the virtual objects provided to the companion user 118; similarly, the companion user 118 can selectively either see or not see the virtual objects provided to the parent user 106. In either case, both the parent computing device 104 and the companion computing device X 116 continue to use the parent map information 128 to track their respective poses within the environment 108.

In a related use scenario, two or more companion users can use respective companion computing devices in the manner described above. Each companion computing device receives the parent map information 128, and tracks its pose in the environment 108 with respect to the parent map information 128. Further, each companion computing device can view the same scene as other users and/or a different version of the scene. Further, each companion computing device can optionally allow a corresponding companion user to control any aspect of a scene.

In a related use scenario, the parent user 106 himself or herself manipulates a companion computing device, such as the representative companion computing device W 114. The companion computing device W 114 can receive the parent map information 128 from the parent computing device 104 and perform any of the functions attributed above to the companion computing device X 116. For instance, the companion computing device W 114 can track its pose within the environment 108 based on the parent map information 128. Further, the parent user 106 can utilize the parent computing device 104 to view a scene from a first vantage point, and can utilize the companion computing device W 114 to simultaneously view the same scene from a second vantage point. The parent user 106 can also optionally control the scene via the companion computing device W 114. Further still, the companion computing device W 114 can interact with the same set of applications as the parent computing device 104, or a different set of applications.

Use Scenario 2. In a second use scenario, the companion computing device X 116 includes the capability of generating its own companion map information. More specifically, in a first implementation, the companion computing device X 116 can receive the parent map information 128 from the parent computing device 104. The companion computing device X 116 can thereafter independently sense the environment 108, and, based thereon, add new features to the parent map information 128. By so doing, the companion computing device X 116 produces an instance of companion map information. In a second implementation, the companion computing device X 116 can generate its own companion map information from "scratch" based on its independent interrogation of the environment 108, without receiving parent map information 128 from the parent computing device 104.

In either of the above scenarios, the companion computing device X 116 can send its companion map information to the parent computing device 104 on a periodic and/or event-driven basis. The parent computing device 104 can thereafter integrate the companion map information with its own native parent map information 128. The parent computing device 104 can perform integration in different ways in different respective implementations. In one case, the parent computing device 104 can compare the features in the companion map information with the features in the parent map information 128. The parent computing device 104 can then form a subset of new features that are present in the companion map information but not present in the parent map information 128. The parent computing device 104 can finally add the subset of new features to the parent map information 128.

In addition, the parent computing device 104 can optionally replace existing features in the parent map information 128 with higher quality counterpart features that are found in the companion map information. Quality can be gauged with respect to any measure. One such measure is an extent to which a feature can be successfully recognized in subsequent instances of newly acquired image information. That is, a feature's quality score increases in proportion to the number of times it is successfully recognized in subsequent instances of newly acquired image information. Hence, assume that the parent map information 128 includes a feature Z that has been successfully recognized x times, while the companion map information includes the same feature Z that has been successfully recognized y times. If y>x, then the parent computing device 104 can replace the parent computing device's version of the feature Z with the companion computing device's version of the same feature. But to facilitate explanation, the following explanation will assume that integration entails just appending new features to the parent map information.

The companion computing device X 116 can also perform the same integration operation as the parent computing device 104. For example, upon receiving a new instance of parent map information 128 from the parent computing device 104, the companion computing device X 116 can: (a) identify a subset of new features that are present in the parent map information 128 but not present in the current state of the companion map information; and (b) add the subset of new features to the companion map information.

In one instance of the above scenario, the companion user 118 can explore a first region of the environment 108 using the companion computing device X 116, while the parent user 106 can explore a second region of the environment 108 using the parent computing device 104. The first region may or may not overlap the second region. The parent computing device 104 develops more robust parent map information by incorporating the contribution of the companion computing device X 116, and the companion computing device X 116 develops more robust companion map information by incorporating the contribution of the parent computing device 104.

Further note that the companion computing device X 116 can also perform the various functions set forth with respect to the first use scenario. For instance, the companion user 118 can manipulate the companion computing device X 116 to view a scene from a first vantage point, while the parent user 106 can manipulate the parent computing device 104 to view the same scene from a second vantage point.

Moreover, plural companion computing devices can interact with the parent computing device 104 in the manner set forth above with respect to the second use scenario, e.g., by generating companion map information and passing the companion map information to the parent computing device 104.

Further, the companion computing device W 114 controlled by the parent user 106 can also interact with the parent computing device 104 in the same manner set forth above with respect to the second use scenario, e.g., by generating companion map information and sending the companion map information to the parent computing device 104.

Use Scenario 3. In a third use scenario, the companion computing device Y 120 captures companion image information from the environment 108, with or without other sensor information. The companion computing device Y 120 then passes the companion image information to the parent computing device 104. The parent computing device 104 can then determine the pose of the companion computing device Y 120 within the environment 108 based on the companion image information, by making reference to the parent map information.

The parent computing device 104 and/or the companion computing device Y 120 can utilize the results of its determination in different ways. In one case, the parent computing device 104 can use the identified pose of the companion computing device Y 120 to present a mixed reality experience that includes a representation of the companion computing device Y 120. For example, the parent computing device 104 can present embellishments around and/or over a representation of the companion computing device Y 120, based on knowledge of the precise location and orientation of the companion computing device Y 120. The parent user 106 can view these embellishments when it views a mixed reality representation of the environment 108, via the parent computing device 104.

In another case, the parent user 106 or a companion user (who is operating the companion computing device Y 120) can issue an instruction to virtually move a graphical object 134 presented on the screen of the companion computing device Y 120 into a free space region of the environment 108, e.g., making a gesture in which the graphical object 134 is swiped off the screen in the direction of the free space region. In response, an application can present a virtual object at an appropriate location in a mixed reality scene, where that virtual object corresponds to the graphical object 134 that was swiped off the screen. The parent user can view the virtual object using the parent computing device 104.

Note that, in the third use scenario, the companion computing device Y 120 need not include a tracking component (for tracking the location of the companion computing device Y 120) or a map-building component (for building map information). It may include only a mechanism for capturing image information (and/or other sensor information) and passing this information to the parent computing device 104. Nevertheless, in another implementation, the companion computing device Y 120 can include a tracking component and/or a map-building component, which allows it to perform the above-identified operations of the first use scenario and the second use scenario, respectively.

Use Scenario 4. In a fourth use scenario, the parent user 106 or a companion user 124 manipulates the companion computing device Z 122. At each instance, the companion computing device Z 122 sends pose information to the parent computing device 104. As noted above, the pose information can be expressed in six degrees of freedom. An application running on (or otherwise accessible to) to the parent computing device 104 then controls a virtual scene based on the pose information. For instance, a companion user can control the actions of a character in a virtual scene by manipulating the companion computing device Z 122.

In one implementation, the companion computing device Z 122 tracks its own pose with reference to parent map information that is passed to it by the parent computing device 104, per the first use scenario described above. In another implementation, the companion computing device Z 122 tracks its own pose with reference to companion map information that it natively develops, per the second use scenario described above.

The above four mixed reality scenarios are set forth in the spirit of illustration, not limitation. Other implementations can make use of additional mixed reality scenarios, not set forth above.

Moreover, in another case described more fully in Subsection A.4, the parent computing device 104 and/or a companion computing device need not provide any user experiences to any user. For instance, the parent computing device 104 can correspond to a parent mobile robot, drone, etc., while the companion computing device can correspond to a companion mobile robot, drone, etc. These kinds of devices can benefit from the distribution of mapping and localization functions described above, without necessarily providing a user experience to any user.

In conclusion to Subsection A.1, the system 102 has various technical merits. For instance, the system 102 allows a companion computing device having limited sensing and/or processing resources to perform complex functions that involve interaction with the environment 108. The system 102 does so by allowing the companion computing device to offload at least some complex processing tasks (such as building a map) to the parent computing device 104. From the opposite perspective, the parent computing device 104 can improve its operation through its cooperative interaction with companion computing device, e.g., by generating more robust parent map information.

A.2. Parent Computing Device

Figure 2:
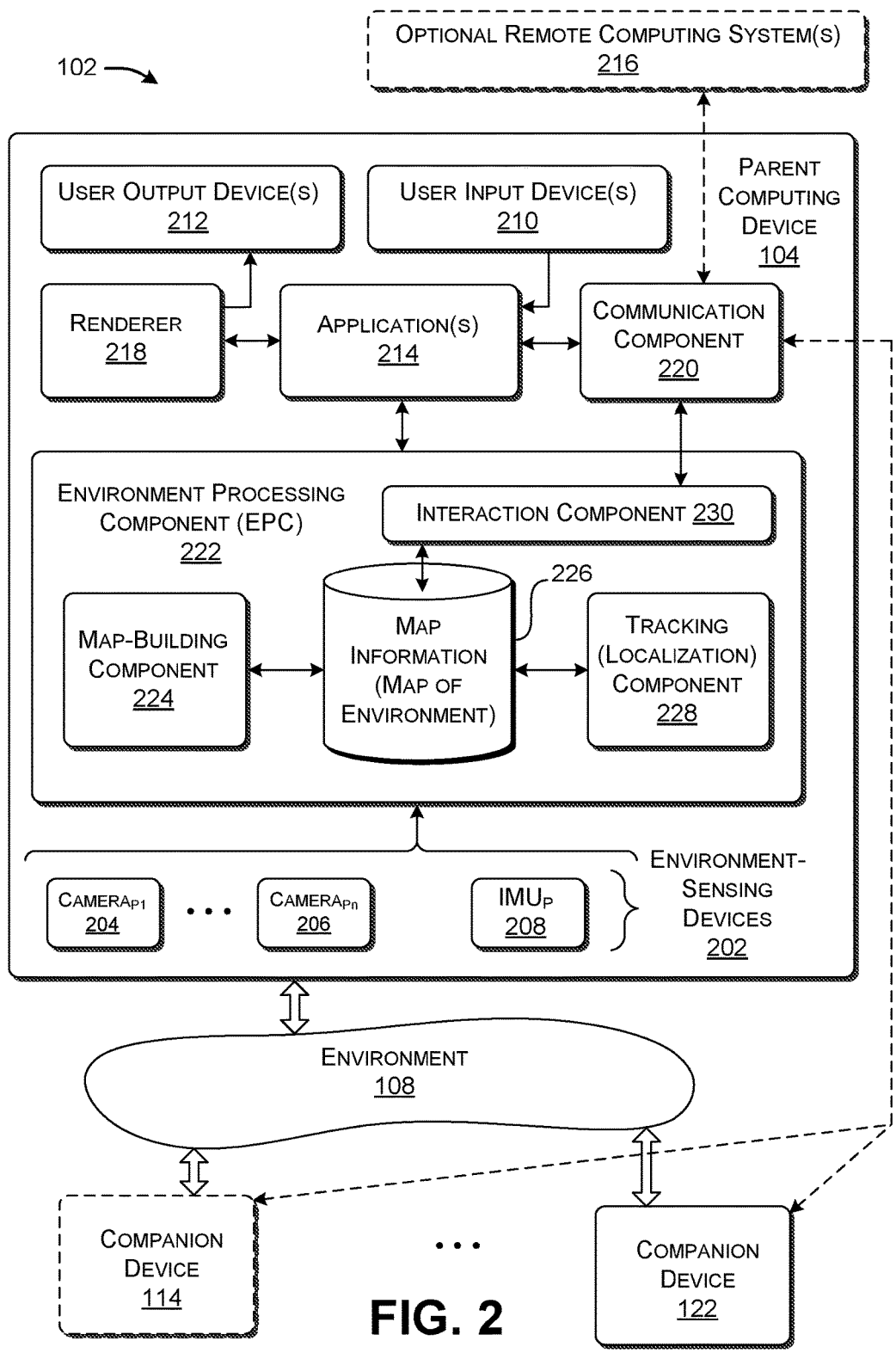
FIG. 2 shows one implementation of a parent computing device, for use in the system of FIG. 1.

FIG. 2 shows one implementation of the parent computing device 104, introduced in Subsection A.1. In one implementation, the parent computing device 104 represents a head-mounted display (HMD). In other implementations, the parent computing device 104 can embody some other form factor described above. To help clarify the description, features of the parent computing device 104 will sometimes be referred to using the prefix "parent," while features of any companion computing device will sometimes be referred to using the prefix "companion."

The parent computing device 104 can include a collection of environment-sensing devices 202. The environment-sensing devices 202 can include one or more parent cameras (204, . . . , 206). For instance, in one case, the parent cameras (204, . . . , 206) can include at least two monochrome cameras. The monochrome cameras can optionally employ a wide field-of-view (such as a field of view greater than 75 degrees, e.g., between 75-120 degrees, etc.). The parent computing device 104 can use a stereoscopic technique to identify the depth of features in the image information produced by the monochrome cameras, relative to the parent computing device 104. In addition, or alternatively, the parent computing device 104 can include one or more color cameras, such as cameras employing RGB CMOS image sensors.

In addition, or alternatively, the parent computing device 104 can include one or more depth camera systems. A depth camera system may work in conjunction with an illumination source (not shown) which illuminates the environment 108 with light. For instance, in a structured light technique, a laser can irradiate the environment 108 with a structured light in the infrared spectrum, e.g., using a diffraction mechanism. In one case, the structured light has a randomized speckle pattern. The structured light spreads across the environment 108 and is distorted by the shapes of different objects in the environment 108. An image sensor of the depth camera system captures the manner in which the structured light impinges the environment 108. The depth camera system then compares the original undistorted pattern with the distorted pattern captured by the image sensor, and determines the depth of points in the environment 108 based on the difference between the undistorted pattern and the distorted pattern.

In another case, a depth camera system uses a time-of-flight technique to determine the depth of objects in the environment. Here, an illumination source produces at least one pulse of infrared light which illuminates the environment 108. An image sensor captures the light reflected by objects in the environment. The depth camera system then reconstructs the depth of each point in the environment 108 based on the time interval between when that point was illuminated, and when the light reflected from that point is received by the image sensor.

The environment-sensing devices 202 can also include at least one parent inertial measurement unit (IMU) 208. The IMU 208 determines the manner in which the parent computing device 104 moves within the environment, or otherwise is placed within the environment. The IMU 208 can include any combination of: one or more accelerometers, one or more gyroscopes, one or more magnetometers, etc.

The environment-sensing devices 202 can also include other types of sensing mechanisms, including a global positing system (GPS) sensing mechanism, a radio source triangulation mechanism, a dead-reckoning sensing mechanism, an odometer, etc.

The parent computing device 104 can also include any combination of user input devices 210 and user output devices 212. For instance, the user input devices 210 can include, but are not limited to, any combination of a key-type input device, a touchscreen input device, a voice-actuated input mechanism, a haptic-type input mechanism, any type of game controller input mechanism, and so on. The user output devices 212 can include, but are not limited to, a visual presentation mechanism (such as a charge-coupled display mechanism or a projection display mechanism), a voice output system in conjunction with one or more speakers, a haptic output mechanism, and so on.

The parent computing device 104 can also include one or more local applications 214. The application(s) 214 can perform any respective operations. For example, one or more applications 214 can provide different kinds of mixed reality experiences or fully immersive virtual experiences. Alternatively, or in addition, the parent computing device 104 can interact with application functionality provided by one or more remote computing systems 216. For example, the parent computing device 104 can rely on a local instantiation of an application to perform a first subset of application functions, and rely on a remote instantiation of the same application (provided by the remote computer system(s) 216) to perform other more computation-intensive operations.

A parent renderer 218 generates representations of three-dimensional scenes on the output device(s) 212. The parent renderer 218 can use conventional graphics technology to perform this task, e.g., by using a set of mathematical transformations to convert a scene in the world coordinate system 130 into to view space. To do so, the parent renderer 218 defines a viewing frustum, specified with respect to a viewing position and viewing direction. The parent renderer 218 further converts the scene from view space to projection space, and then from projection space to screen space (where all such transformation can be optionally combined into a single mathematical transformation). The parent renderer 218 can use a conventional 3D pipeline to perform these tasks, e.g., using vertex shaders, pixel shaders, etc. Further, the parent render 218 can use any acceleration platform to perform these tasks, such as one or more graphics processing units (GPUs) and/or other acceleration hardware.

A parent communication component 220 enables the parent computing device 104 to interact with the companion computing device(s) and the remote computing system(s) 216. The parent communication component 220 can include a network interface card or the like. The parent communication component 220 can support communication via any communication mode or combination of communication mode, including a wireless communication mode (e.g., a Wi-Fi or BLUETOOTH communication mode) and/or a hardwired communication mode (employing physical communication wires or cables).

A parent environment processing component (EPC) 222 interprets the pose of the parent computing device 104 within the environment 108, based on the image information provided by the parent cameras (204, . . . , 206) and the movement information provided by the parent IMU 208. For instance, a parent map-building component 224 generates parent map information 128 that describes the environment 108. A data store 226 stores the parent map information 128.

In one case, the parent map-building component 224 describes the environment 108 by identifying a collection landmarks that appear in the parent image information, e.g., associated with telltale edges, corners, etc. in the parent image information. These landmarks are referred to as features herein. The parent map information 128 can represent each feature by providing an image patch that encompasses the feature. The parent map information 128 can also store the position of each such feature in the world coordinate system 130.

A parent tracking (localization) component 228 determines the pose of the parent computing device 104 within the environment 108. The parent tracking component 228 performs this task based on the parent map information 128 provided in the data store 226, together with the image information provided by the parent cameras (204, . . . , 206) and the movement information provided by the parent IMU 208.

Figure 7:
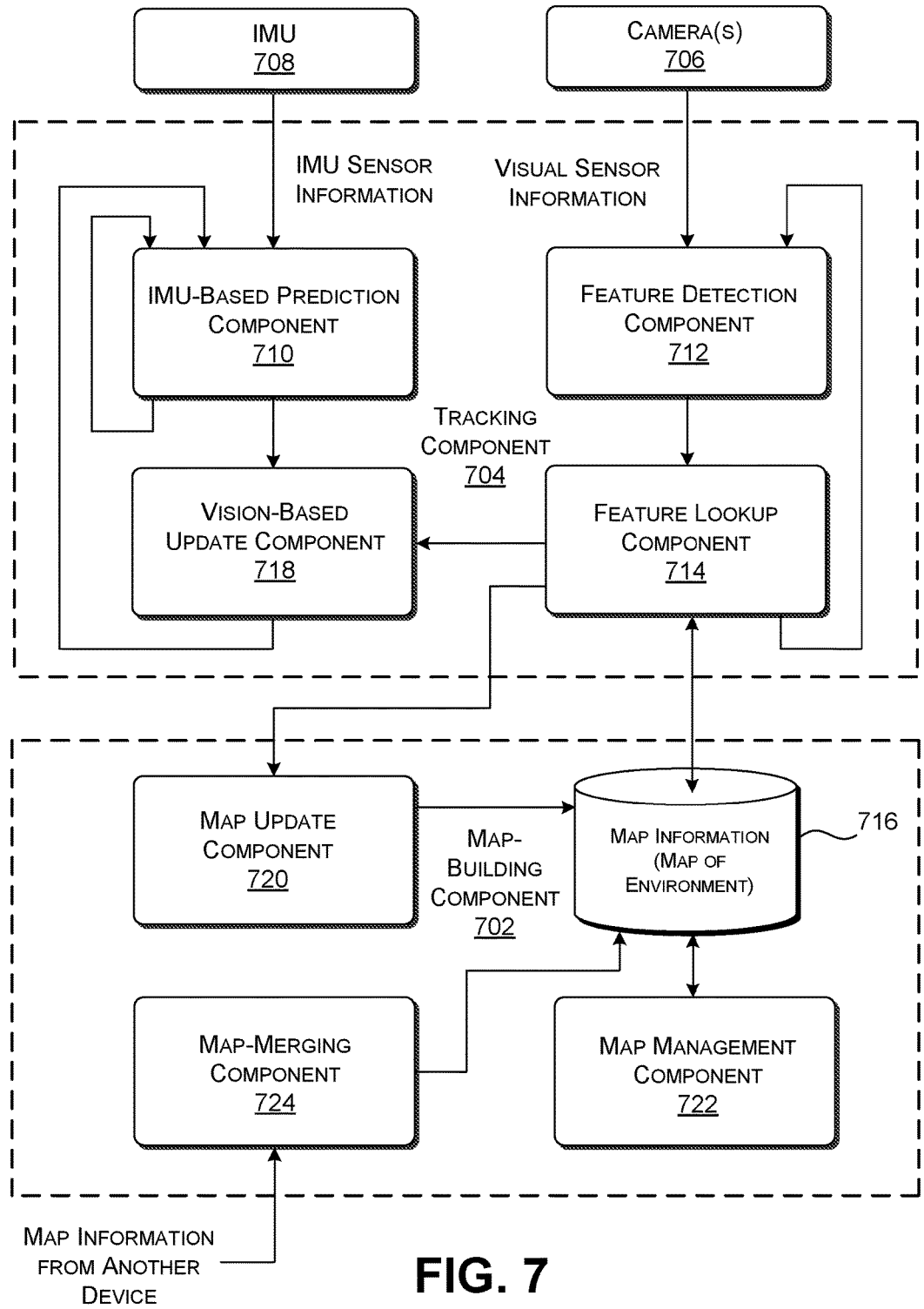
FIG. 7 shows one implementation of a map-building component and a tracking component, for use in the system of FIG. 1.

Subsection A.5, with reference to FIG. 7, will provide additional illustrative detail regarding the construction and operation of the parent map-building component 224 and the parent tracking component 228. By way of preview, the parent EPC 222 can use any Simultaneous Localization and Mapping (SLAM) technique to implement the functions of the parent map-building component 224 and the parent tracking component 228.

A parent interaction component 230 enables the parent EPC 222 to send any data (such as an instance of the parent map information 128) to a counterpart EPC of any companion computing device. For instance, the parent interaction component 230 can send the parent map information 128 to a companion computing device on a periodic basis, on an event-driven basis, e.g., when the parent map information 128 has changed by a prescribed amount and/or a companion computing device explicitly requests the parent map information 128.

In addition, or alternatively, the parent interaction component 230 enables the parent EPC 222 to receive any data (such as an instance of companion map information) from any companion computing device. Upon receipt of the companion computing map information, the parent map-building component 224 can integrate the companion map information into the parent map information 128. For instance, the parent map-building component 224 can identify new features in the companion map information and then add them to the parent map information.

A.3. Companion Computing Devices

Figure 3:
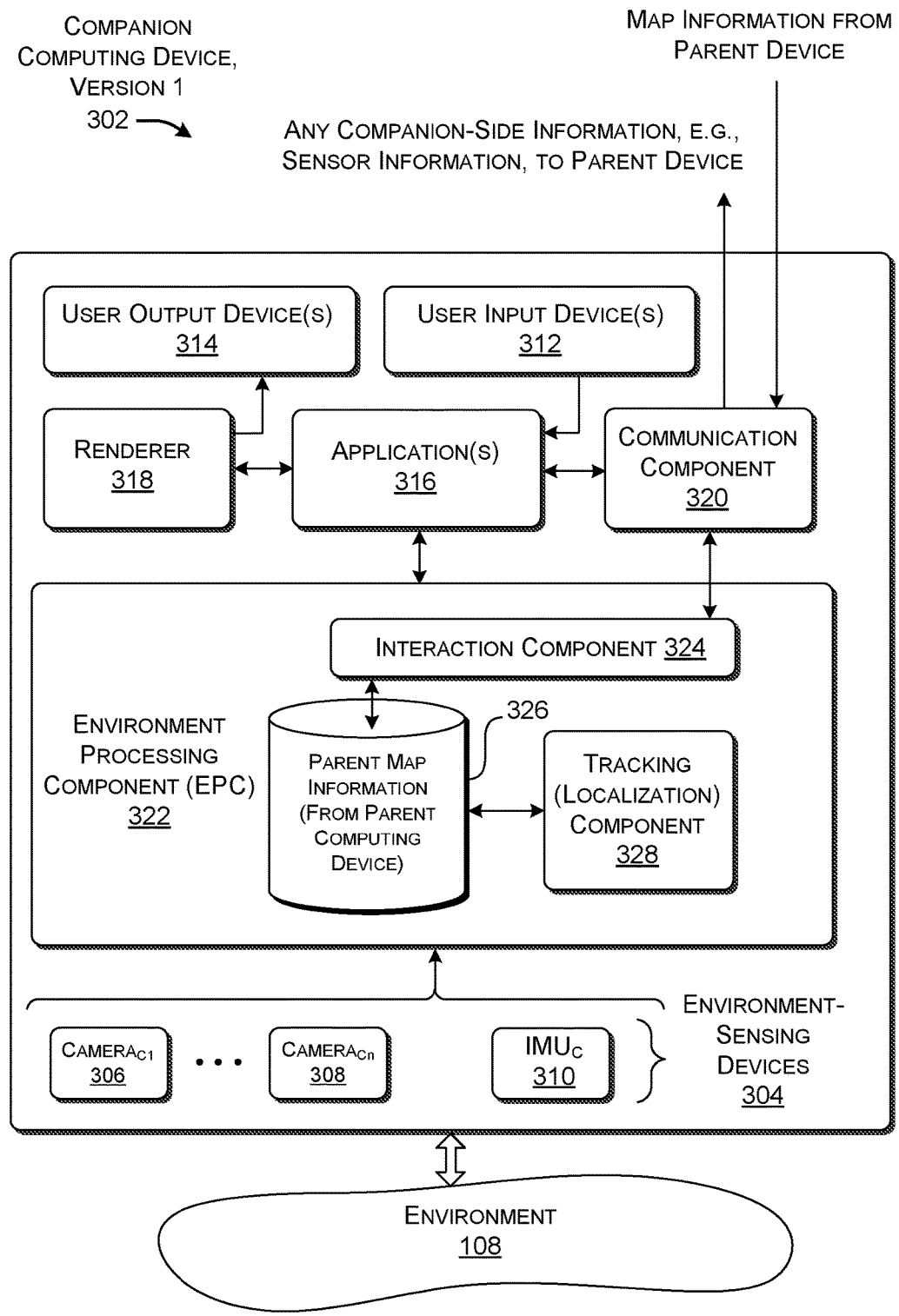
FIGS. 3-5 show three respective implementations of a companion computing device, for use in the system of FIG. 1.

FIG. 3 shows a first implementation of a companion computing device 302. The companion computing device 302 can include counterpart elements to the parent computing device 104 described in Subsection A.2. For instance, the companion computing device can include a collection of environment-sensing devices 304, including one or more companion cameras (306, . . . , 308), and a companion IMU

310. The companion camera(s) (306, . . . , 308) provide companion image information that depicts the environment 108 in visual form from the vantage point of the companion computing device 302. The companion IMU 310 captures companion movement information which expresses the movement of the companion computing device 302 within the environment 108.

The companion computing device 302 can also include one or more user input devices 312, one or more user output devices 314, one or more local applications 316, a companion renderer 318, and a companion communication component 320. All such elements perform the same-named functions as those described above with reference to the parent computing device 104. In the context of the companion computing device 302, the companion communication component 320 allows the companion computing device 302 to exchange data with the parent computing device 104. Although not shown, the companion computing device 302 can also interact with one or more remote computing systems. For instance, the companion computing device 302 may call on a remote computing system to perform computation-intensive application functions.

The companion computing device 302 also includes a companion environment processing component (EPC) 322 for interpreting the environment 108. In the first implementation shown in FIG. 3, the companion EPC 322 includes a companion interaction component 324 for receiving the parent map information 128 from the parent computing device 104, and storing it in a data store 326. A companion tracking component 328 then tracks the movement of the companion computing device 302 with reference to the parent map information 128, based on the companion image information provided by the companion camera(s) (306, . . . , 308) and the companion movement information provided by the companion IMU 310. Subsection A.5 below provides additional information regarding one manner of operation of the companion tracking component 328.

Note that while the companion computing device 302 may include some of the same components as the parent computing device 104 described above, in some implementations, it may provide reduced-complexity counterparts of some of the components. For instance, as noted above, the parent computing device 104 can employ two or more monochrome cameras. The parent computing device 104 can leverage the parent image information provided by these cameras to determine the depth of the objects in the environment 108, relative to the parent computing device 104. While some implementations of the companion computing device 302 may include these kinds of monochrome cameras, in other implementations, the companion computing device 302 may employ a single camera, such as a single RGB camera. In some implementations, the single RGB camera can be enhanced to provide a wide field-of-view, such as a field of view of at least 75 degrees, etc. In other cases, the companion computing device 302 employs a single RGB camera and a single monochrome camera having a wide field-of-view.

Figure 4:
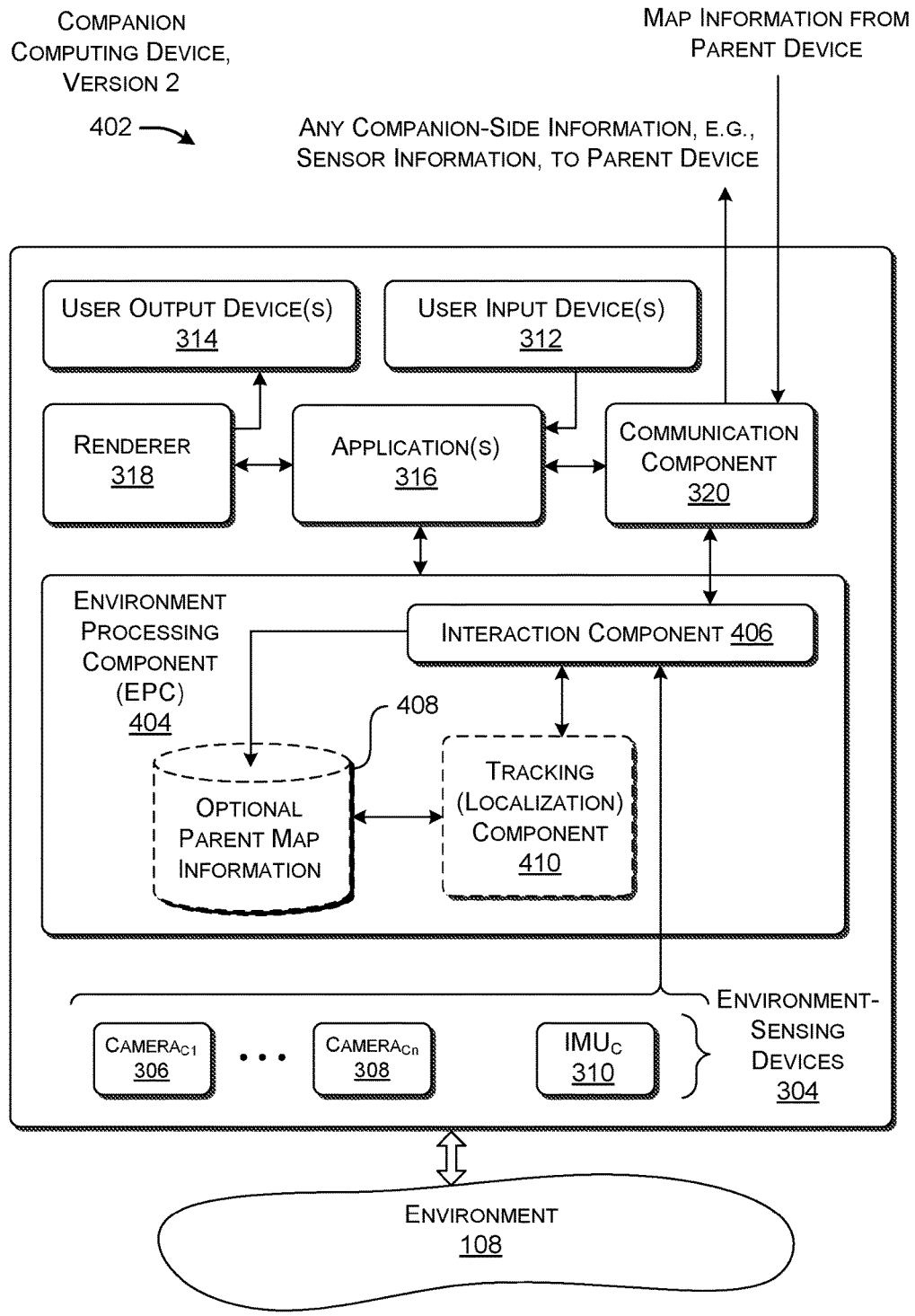

FIG. 4 shows a second implementation of a companion computing device 402. The companion computing device 402 includes many of the same elements as the companion computing device 302 described above, including a collection of environment-sensing devices 304, such as one or more companion cameras (306, . . . , 308), and a companion IMU 310. The companion computing device 402 also includes one or more user input devices 312, one or more user output devices 314, one or more local applications 316, a companion renderer 318, and a companion communication component 320. These components perform the same functions as the same-named components described above, with respect to the first version of the companion computing device 302.

In the case of FIG. 4, a companion environment processing component (EPC) 404 collects raw sensor information, such as raw companion image information from the companion camera(s) (306, . . . , 308) and/or raw movement information from the companion IMU 310. It then forwards this sensor information to the parent computing device 104, via the companion interaction component 406. The parent computing device 104 then consults it parent map information 128 to identify the current pose of the companion computing device 402 within the environment, based on the received sensor information.

In another implementation, the companion EPC 404 receives the parent map information 128, and stores it in a data store 408. A companion tracking component 410 then tracks the current pose of the companion computing device 402. The companion interaction component 406 may forward information regarding the current pose to the parent computing device 104.

The parent computing device 104 can utilize the raw sensor information and/or the pose information in different ways described in Subsection A.1. For instance, the parent computing device 104 can leverage this information to project embellishments over and/or around the companion computing device 402 in a mixed reality scene that includes the companion computing device 402.

Figure 5:
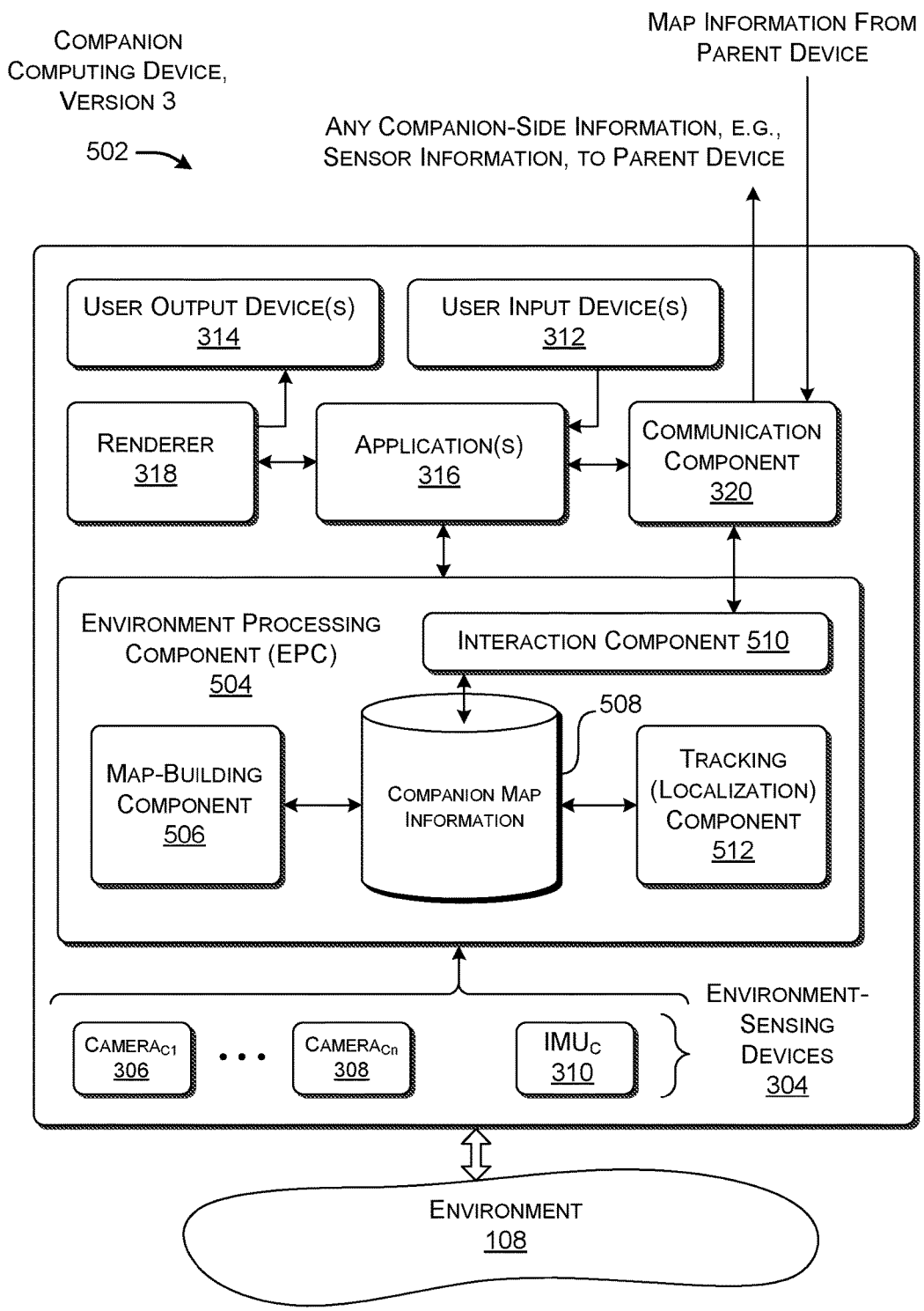

FIG. 5 shows a third implementation of a companion computing device 502. The companion computing device 502 includes many of the same elements as the companion computing device 302 described above, including a collection of environment-sensing devices 304, such as one or more companion cameras (306, . . . , 308), and a companion IMU 310. The companion computing device 502 also includes one or more user input devices 312, one or more user output devices 314, one or more local applications 316, a companion renderer 318, and a companion communication component 320. These components perform the same functions and provide the same information as the same-named components described above, with respect to the first version of the companion computing device 302.

In the case of FIG. 5, a companion environment processing component (EPC) 504 includes a local companion map-building component 508 that builds companion map information based on the companion map's interaction with the environment 108, and then stores the companion map information in a data store 508. A companion interaction component 510 then transfers the companion map information on a periodic basis and/or an event-driven basis to the parent computing device 104. The parent computing device 104 integrates the parent map information 128 with the received instance of the companion map information, e.g., by adding any new features in the companion map information to the parent map information 128. A local companion tracking component 512 tracks the pose of the companion computing device 502 with reference to the companion map information stored in the data store 508.

More specifically, in a first implementation, the EPC 504 generates the companion map information from "scratch," without reference to the parent map information 128. In a second implementation, the EPC 504 receives instances of the parent map information 128 from the parent computing device 104 on a periodic and/or event-driven basis. The companion computing device 502 integrates each instance of a the parent map information 128 by adding any new features identified in the parent map information (with reference to the current companion map information) to the companion map information. Hence, in this implementation, the parent computing device 104 updates its map information based on newly discovered features in the companion map information, and the companion computing device 502 performs the complementary operation of updating its map information based on any new discovered features in the parent map information 128.

A.4. Mixed Reality Functionality

Figure 6:
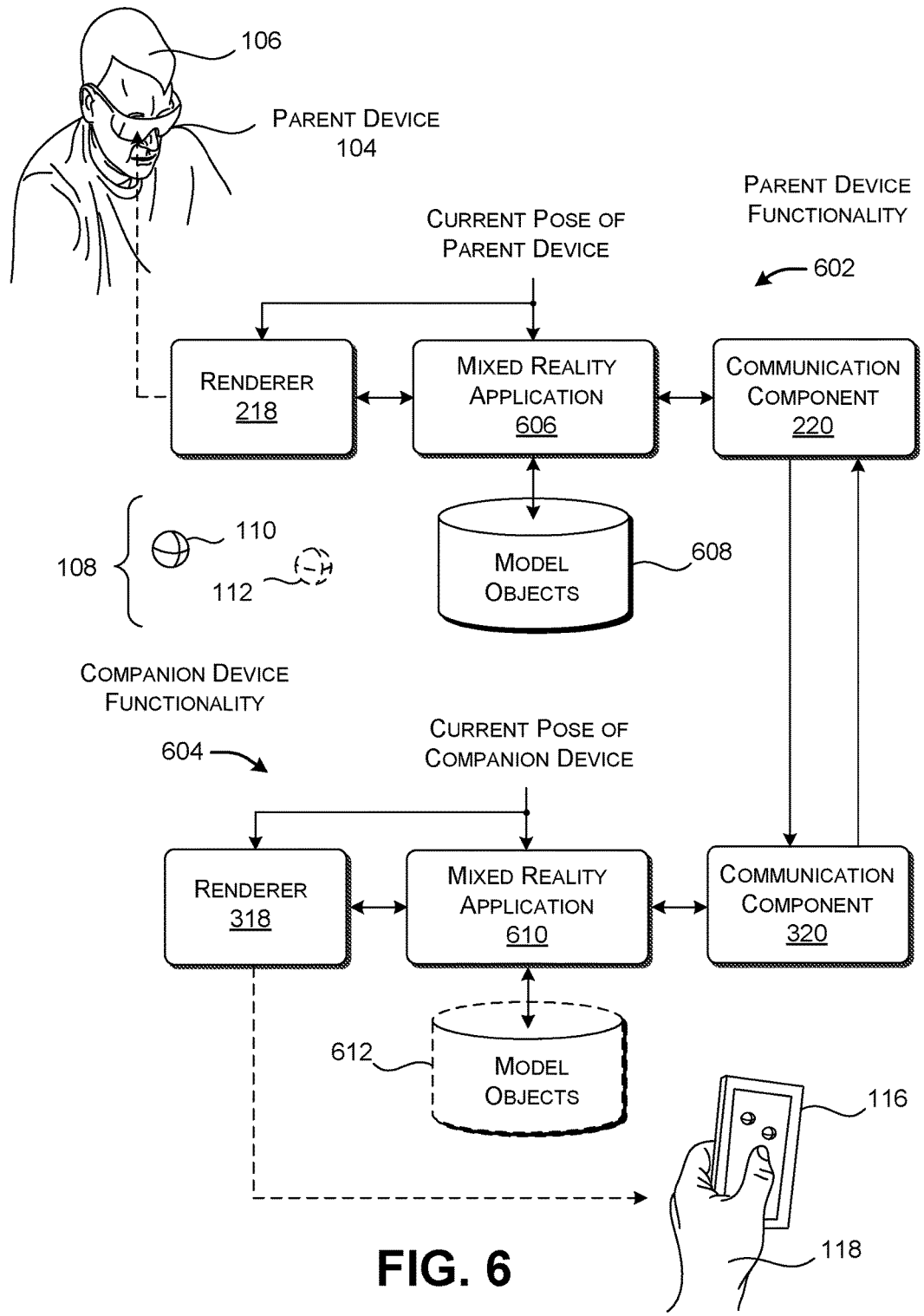
FIG. 6 shows parent device functionality and companion device functionality that can be used in the system of FIG. 1 to provide a mixed reality experience.

FIG. 6 shows a use scenario in which parent device functionality 602 provides a first user experience to the parent user 106, while companion device functionality 604 provides a second user experience to a companion user 118. Further assume that the parent computing device 104 implements the parent device functionality 602, as shown in FIG. 2, while the companion computing device 302 implements the companion device functionality 604, as shown in FIG. 3.

With respect to the parent device functionality 602, a mixed reality application 606 receives pose information from the parent tracking component 228 (of FIG. 2). Based thereon, the mixed reality application 606 determines the elements of a scene that will be visible to the parent user 106. The mixed reality application 606 performs this task by generating a viewing frustum defined by the current position of the parent computing device 104 and the current orientation of the parent computing device 104; the mixed reality application 606 then determines the portion of the world coordinate system 130 encompassed by the viewing frustum. Assume that, as a result of these determinations, the mixed reality application 606 generates a scene that includes at least one virtual object 112. In some implementations, the mixed reality application 606 can construct the virtual object 112 based on corresponding model information provided in a data store 608. For instance, the model information describes the vertices and textures that are used to construct the virtual object 112.

The parent renderer 218 can project the scene generated by the mixed reality application 606 from the vantage point of the current pose of the parent computing device 104. As a result, the parent user 106 will see the virtual object 112 overlaid on the physical environment 108. Assume that the physical environment 108 includes at least one physical object 110. Background information on the general topic of 3D computer graphics processing can be found in, for instance, Watt, Allen, 3*D Computer Graphics*, Addison-Wesley 3rd edition, December 1999. Background information the general topic of augmented reality technology can be found, in, for instance, Aukstakalnis, Steve, *Practical Augmented Reality: A Guide to the Technologies*, Addison-Wesley Professional, 1st edition, Sep. 18, 2016.

A parent HMD can intermix real and virtual objects in different ways. In an optical see-through technique, the parent HMD can use a semi-transparent mirror that projects computer-generated images to the parent user, while allowing the parent user to view the actual environment through the semi-transparent mirror. In a video see-through technique, the parent HMD can capture image information from the environment, electronical mix the image information with the computer-generated images, and present the resultant scene to the user.

Now referring to the companion device functionality 604, a counterpart mixed reality application 610 receives pose information from the companion tracking component 328 (of FIG. 3). Based thereon, the mixed reality application 610 determines the elements of a scene that will be visible to companion user 118, e.g., based on the current position of the companion user 118 and the direction in which the companion user 118 is presumed to be looking at the present time. Assume that, as a result of these determinations, the mixed reality application 610 generates a scene that includes the same virtual object 112 that is presented to the parent user 106. In some implementations, the mixed reality application 610 can construct the virtual object 112 based on corresponding model information provided in a local data store 612. In other implementations, the mixed reality application 610 can receive the model information directly from the parent computing device 104.

The companion renderer 318 can project the scene generated by the mixed reality application 610 from the vantage point of the current pose of the companion computing device X 116. As a result, the companion user 118 will see the virtual object 112 overlaid on the physical environment 108. But the companion user 118 may be given a different view of the virtual object 112 compared to the parent user 106, assuming that the companion user 118 looks at the environment 108 from a different vantage point compared to the parent user 106.

A handheld companion computing device (such as a smartphone) can provide a mixed reality presentation to the user in different ways. In one way, the handheld companion computing device can use its camera(s) to capture image information of the environment. The handheld companion computing device can then overlay the computer-generated virtual objects onto the image information captured by the camera(s), at appropriate respective positions on its display screen.

In some cases, the mixed reality application 610 running on (or otherwise accessible to) the companion computing device X 116 allows the companion user 118 to perform actions on the virtual object 112, and to thereby change the state of the virtual object 112. The companion communication component 320 can send input information regarding the companion user's action to the parent computing device 104, whereupon the mixed reality application 606 can update its version of the scene based thereon.

In another application, the parent computing device 104 and the companion computing device 114 can present entirely virtual scenes to the parent user 106 and the companion user 118, respectively.

In another application, the parent computing device 104 performs mapping and localization without necessarily providing a user experience to a parent user. In addition, or alternatively, the companion computing device X 116 can perform any of the functions described with respect to FIGS. 3-5 without necessarily providing a user experience to a companion user.

For instance, the parent computing device 104 may correspond to a mobile robot, drone, etc. that performs both mapping and localization. The companion computing device may refer to another mobile robot, drone, etc. that performs any of the functions described with respect to FIGS. 3-5. These mobile robots or drones need not provide any user experiences to users. As before, the companion computing device can have reduced environment-sensing and/or processing power compared to the parent computing device.

Consider, for example, the case in which a parent mobile robot performs mapping to generate parent map information, in the course of exploring an environment. The parent mobile robot performs localization with respect to its own parent map information. The parent mobile robot can also pass instances of the parent map information to a companion mobile robot on a periodic and/or event-driven basis. The companion mobile robot can then perform localization with respect to the parent map information. In other words, the companion mobile robot can forgo the task of developing its own native companion map information. In this example, a companion mobile robot that is less complex than the parent mobile robot can still perform high-quality localization, without devoting the resources needed to generate its own native map information.

A.5. Mapping and Tracking Functionality

FIG. 7 shows one implementation of a map-building component 702 and a tracking component 704. The map-building component 702 builds map information that represents the environment 108, while the tracking component 704 tracks the pose of a computing device with respect to the map information. Either the parent computing device 104 or any companion computing device can implement the map-building component 702 and the tracking component 704. Hence, this subsection will be framed in the context of a generic computing device (which can refer to either the parent computing device 104 or a companion computing device). But in other implementations, a companion computing device can optionally omit the map-building component 702, or both the map building component 702 and the tracking component 704.

The map-building component 702 operates on the basis of at least image information provided by one or more cameras 706. For instance, in the case of the parent computing device 104, the camera(s) 706 may correspond to at least two monochrome cameras. The map-building component 702 can leverage the image information from these cameras to identify depth of features within the environment 108. In the case of a companion computing device, the camera(s) 706 may correspond to two or more monochrome cameras (like the parent computing device 104), or a single RGB camera or a single wide field-of-view monochrome camera, etc.

The tracking component 704 operates on the basis of the image information provided by the camera(s) 706 and movement information provided by at least one inertial measurement unit (IMU) 708. As described above, the IMU 708 can include one or more accelerometers, one or more gyroscopes, one or more magnetometers, and so on.

Beginning with the tracking component 704, an IMU-based prediction component 710 predicts the pose of the computing device based on a last estimate of the pose in conjunction with the movement information provided by the IMU 708. For instance, the IMU-based prediction component 710 can integrate the movement information provided by the IMU 708 since the pose was last computed, to provide a movement delta value. The movement delta value reflects a change in the pose of the computing device since the pose was last computed. The IMU-based prediction component 710 can add this movement delta value to the last estimate of the pose, to thereby update the pose.

A feature detection component 712 determines features in the image information provided by the camera(s) 706. For example, the feature detection component 712 can use any kind of image operation to perform this task. For instance, the feature detection component 712 can use a Scale-Invariant Feature Transform (or SIFT) operator. Alternatively, or in addition, the feature detection component 712 can use a Features from Accelerated Segment Test (FAST) operator. Alternatively, or in addition, the feature detection component 712 can use a Harris operator or a Harris-Laplace operator. Alternatively, or in addition, the feature detection component 712 can employ the Shi & Tomasi operator described by Shi, et al., "Good Features to Track," in *Proceedings of the IEEE Computer Society Conference on Computer Vision and Pattern Recognition*, 1994, pp. 593-600, and so on.

A feature lookup component 714 determines whether the features identified by the feature detection component 712 match any previously stored features in the current map information (as provided in a data store 716). The feature lookup component 714 can perform the above-described operation in different ways. Consider the case of a single discovered feature that is identified in the input image information. In one approach, the feature lookup component 714 can exhaustively examine the map information to determine whether it contains any previously-encountered feature that is sufficiently similar to the discovered feature, with respect to any metric of feature similarity.

In another approach, the feature lookup component 714 can identify a search region within the map information, defining the portion of the environment 108 that should be visible to the computing device, based on a current estimate of the pose of the computing device. The feature lookup component 714 can then search that region within the map information to determine whether it contains a previously-encountered feature that matches the discovered feature.

A vision-based update component 718 updates the pose of the computing device on the basis of any features discovered by the feature lookup component 714. In one approach, the vision-based update component 718 can determine the presumed position of the computing device through triangulation or a like reconstruction technique. The vision-based update component 718 performs this operation based on the known positions of two or more detected features in the image information. A position of a detected feature is known when that feature has been detected on a prior occasion, and the estimated location of that feature has been stored in the data store 716.

In one mode of operation, the IMU-based prediction component 710 operates at a first rate, while the vision-based update component 718 operates at a second rate, where the first rate is significantly greater than the second rate. The tracking component 704 can opt to operate in this mode because the computations performed by the IMU-based prediction component 710 are significantly less complex than the operations performed by the vision-based update component 718 (and the associated feature detection component 712 and feature lookup component 714). But the predictions generated by the IMU-based prediction component 710 are more subject to error and drift compared to the estimates of the vision-based update component 718. Hence, the processing performed by the vision-based update component 718 serves as a correction to the less complex computations performed by the IMU-based prediction component 710.

Now referring to the map-building component 702, a map update component 720 adds a new feature to the map information (in the data store 716) when the feature lookup component 714 determines that a feature has been detected that has no matching counterpart in the map information. In one non-limiting application, the map update component 720 can store each feature as an image patch, e.g., corresponding to that portion of an input image that contains the feature. The map update component 720 can also store the position of the feature, with respect to the world coordinate system 130.

A map management component 722 can manage the storage and removal of features from the data store 716. For example, the map management component 722 can prohibit the storage of a newly discovered feature if there is an existing feature that is sufficiently close to the existing feature in the world coordinate system 130, with respect to any threshold level of proximity. In addition, the map management component 722 can delete features that have not been detected a sufficient number of times in subsequent instances of image information captured by the computing device, with respect to any environment-specific threshold level that defines sufficiency.

The data store 716 can organize the features of the map information in a relational data structure. That data structure captures information which represents the positional relationship of one feature with respect to other nearby features. Hence, the map management component 722 can bind together previously disconnected portions of the map information when features are discovered which evince the nexus between those separate portions.

A map-merging component 724 can add the features of one instance of map information to another instance of map information. For example, assume that the map information in the data store 716 pertains to parent map information 128 generated by the parent computing device 104. And assume that the parent computing device 104 receives companion map information from a companion computing device. In this case, the map-merging component 724 can identify new features in the incoming companion map information (with respect to the current parent map information 128), and add those new features to the parent map information 128.

In one non-limiting implementation, the tracking component 704 and the map-building component 702 can be implemented as any kind of SLAM-related technology. In addition to the functions described above, the SLAM-related technology maintains an evolving estimate of the uncertainty associated with the computing device's current pose, and the uncertainty associated with the each feature in the map information. In one implementation, the tracking component 704 and the map-building component 702 can use an Extended Kalman Filter (EFK) to perform the SLAM operations. An EFK maintains map information in the form of a state vector and a correlation matrix. In another implementation, the tracking component 704 and the map-building component 702 can use a Rao-Blackwellised filter to perform the SLAM operations.

Background information regarding the general topic of SLAM can be found in various sources, such as Durrant-Whyte, et al., "Simultaneous Localisation and Mapping (SLAM): Part I The Essential Algorithms," in *IEEE Robotics & Automation Magazine*, Vol. 13, No. 2, July 2006, pp. 99-110, and Bailey, et al., "Simultaneous Localization and Mapping (SLAM): Part II," in *IEEE Robotics & Automation Magazine*, Vol. 13, No. 3, September 2006, pp. 108-117.

In some cases, the tracking component 704 and the map-building component 702 can perform their SLAM-related functions with respect to image information produced by a single camera, rather than, for instance, two or more monochrome cameras. This may be the case with respect to a companion computing device that has reduced environment-sensing capabilities compared to the parent computing device 104. The tracking component 704 and the map-building component 702 can perform mapping and localization in this situation using a MonoSLAM technique. A MonoSLAM technique estimates the depth of feature points based on image information captured in a series of frames, e.g., by relying on the temporal dimension to identify depth. Background information regarding one version of the MonoSLAM technique can be found in Davidson, et al., "MonoSLAM: Real-Time Single Camera SLAM," in *IEEE Transactions on Pattern Analysis and Machine Intelligence*, Vol. 29, No. 6, June 2007, pp. 1052-1067.

B. Illustrative Processes

FIGS. 8-12 show processes that explain the operation of the system 102 of Section A in flowchart form. Since the principles underlying the operation of the system 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

Figure 8:
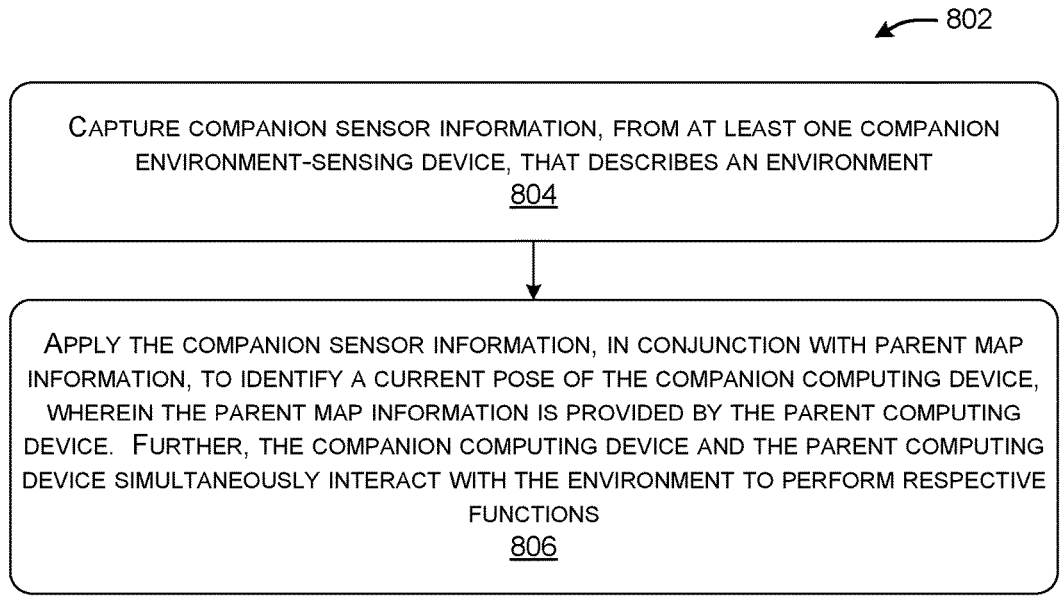
FIG. 8 shows a process that describes one manner of operation of the system of FIG. 1.

FIG. 8 shows a process 802 for using a companion computing device to interact with a parent computing device 104. In block 804, the companion computing device captures companion sensor information, from at least one companion environment-sensing device 304, that describes the environment 108. In block 806, the companion computing device applies the companion sensor information, in conjunction with parent map information 128, to identify a current pose of the companion computing device. The parent map information 128 is provided by the parent computing device 104. Further, the companion computing device and the parent computing device 104 simultaneously interact with the environment 108 to perform respective functions. Further, the parent map information 128 represents features in the environment 108 with reference to a world coordinate system 130 shared by the companion computing device and the parent computing device 104.

Figure 9:
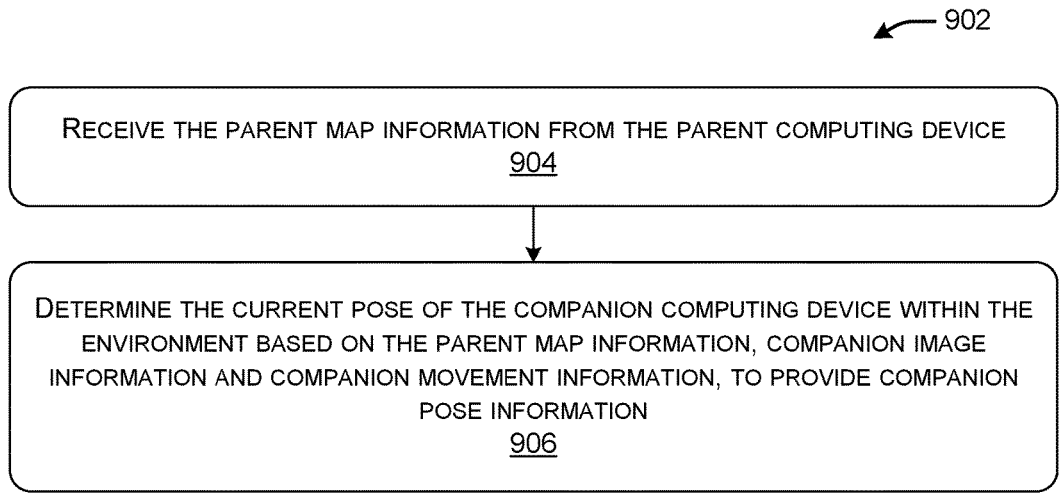
FIGS. 9-12 show processes that represent different use case scenarios of the system of FIG. 1.

FIG. 9 shows a process 902 that represents one mode of operation of the companion computing device, e.g., corresponding to the implementation of FIG. 3. Assume that the companion environment-sensing device(s) 304 include: at least one companion camera (306, . . . , 308) for capturing companion image information that depicts the environment 108, and at least one companion inertial measurement unit 310 for capturing companion movement information that represents movement of the companion computing device within the environment 108. In block 904, the companion computing device receives parent map information from the parent computing device 104. In block 906, the companion computing device determines the current pose of the companion computing device within the environment 108 based on the parent map information 128, the companion image information and the companion movement information, to provide companion pose information.

Figure 10:
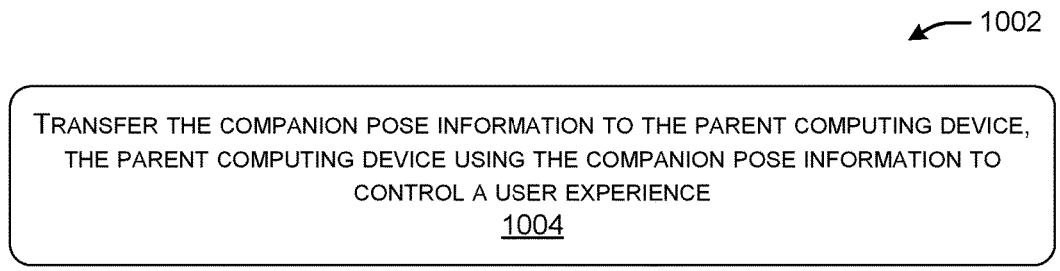

FIG. 10 shows a process 1002 that represents another mode of operation of the companion computing device. In block 1004, the companion computing device transfers the companion pose information to the parent computing device 104. The transferred companion pose information enables the parent computing device 104 to control a user experience based on the companion pose information.

Figure 11:
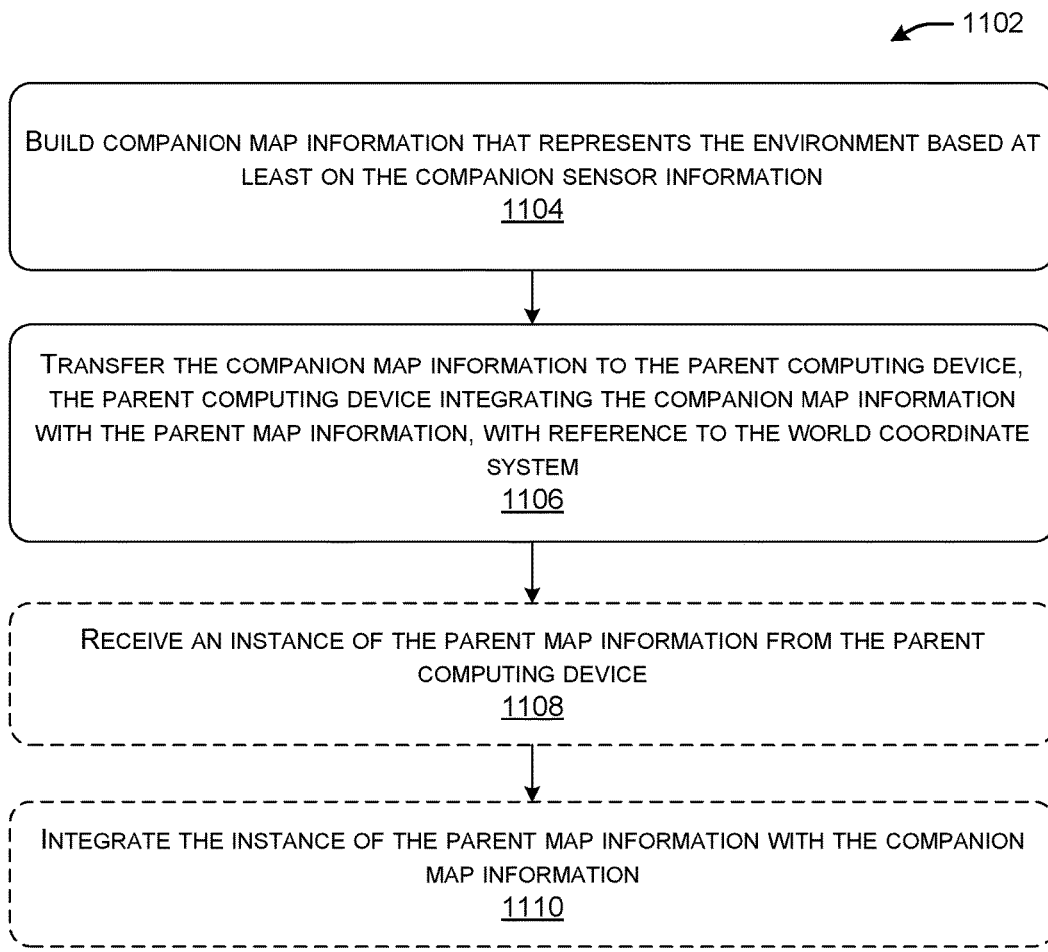

FIG. 11 shows a process 1102 that represents another mode of operation of the companion computing device, e.g., corresponding to the implementation of FIG. 5. In block 1104, the companion computing device builds companion map information that represents the environment 108 based at least on the companion sensor information. In block 1106, the companion computing device transfers the companion map information to the parent computing device 104. The parent computing device 104 is configured to integrate the companion map information with the parent map information 128, with reference to the world coordinate system 130.

In an optional reciprocal operation, in block 1108, the companion computing device receives an instance of the parent map information 128 from the parent computing device 104. In block 1110, the companion computing device integrates the instance of the parent map information 128 with the companion map information.

Figure 12:
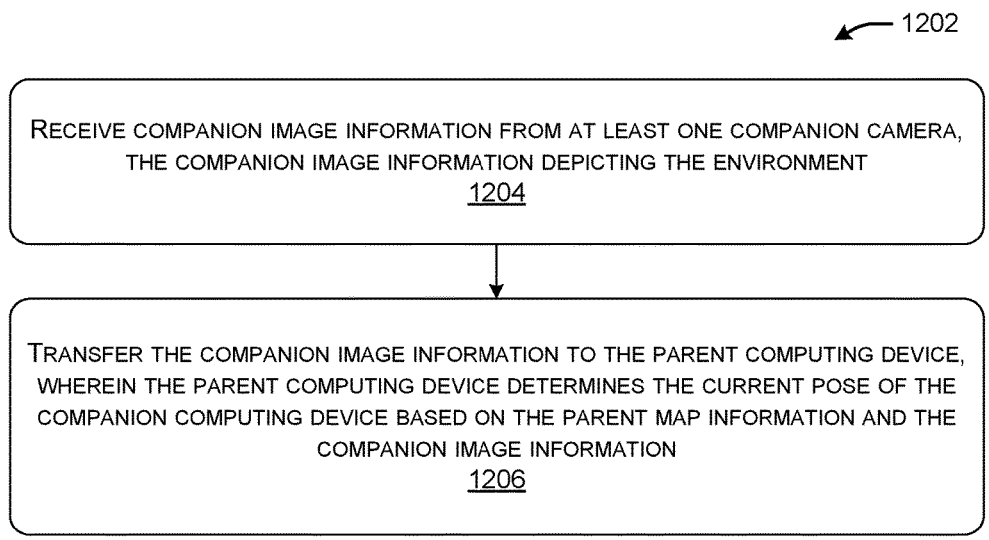

FIG. 12 shows a process 1202 that represents another mode of operation of the companion computing device, e.g., corresponding to the implementation of FIG. 4. In block 1204, the companion computing device receives companion image information from at least one companion camera (306, . . . , 308), the companion image information depicting the environment 108. In block 1206, the companion computing device transfers the companion image information to the parent computing device 104. In one implementation, the parent computing device 104 determines the current pose of the companion computing device based on the parent map information 128 and the companion image information.

C. Representative Computing Functionality

Figure 13:
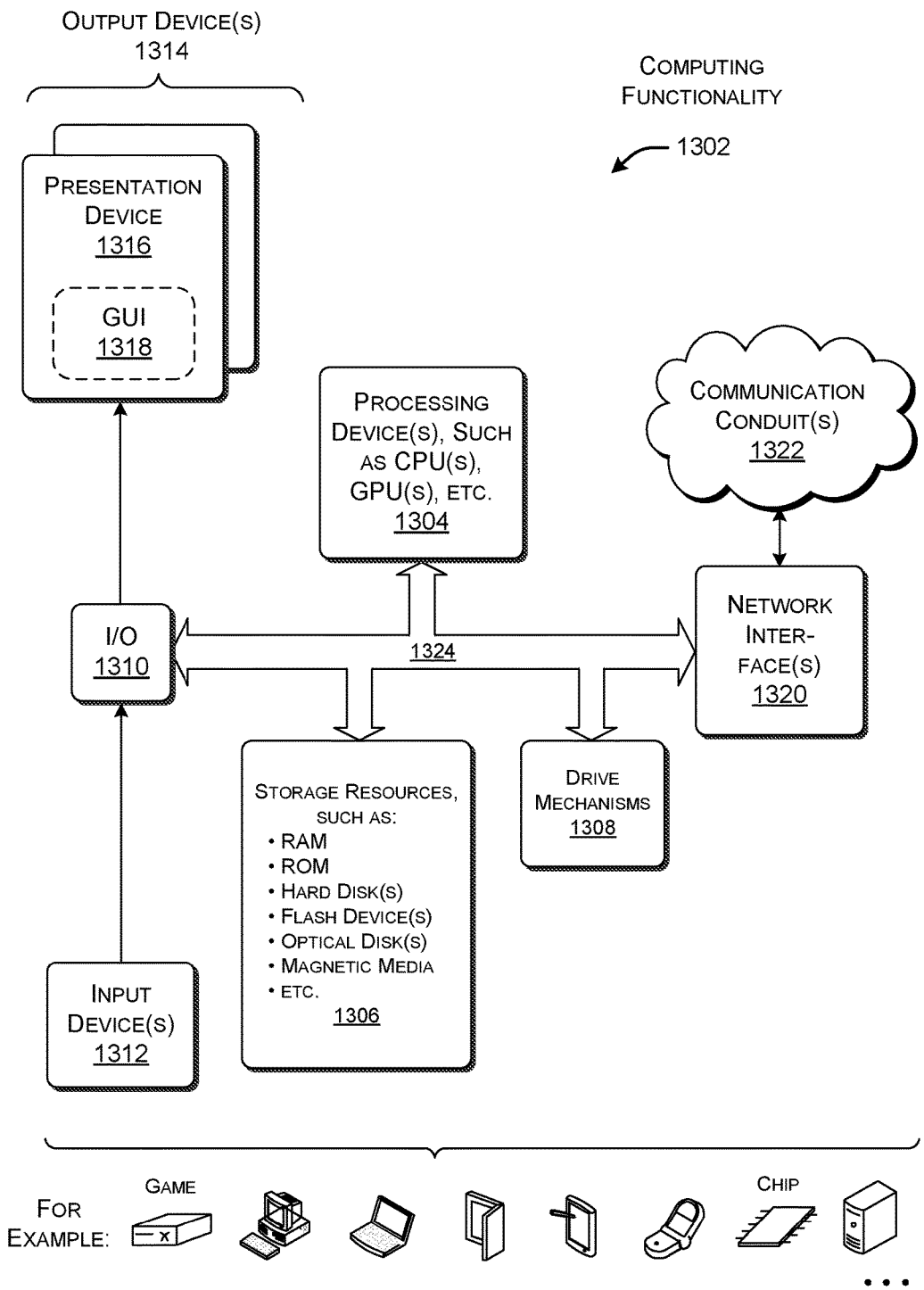
FIG. 13 shows illustrative computing functionality that can be used to implement any aspect of the features shown in the foregoing drawings.

FIG. 13 shows computing functionality 1302 that can be used to implement any aspect of the mechanisms set forth in the above-described figures. For instance, the type of computing functionality 1302 shown in FIG. 13 can be used to implement aspects of the parent computing device 1046 of FIG. 2, or aspects of any of the companion computing devices (302, 402, 502) of FIGS. 3-5. In all cases, the computing functionality 1302 represents one or more physical and tangible processing mechanisms.

The computing functionality 1302 can include one or more hardware processor devices 1304, such as one or more central processing units (CPUs), and/or one or more graphics processing units (GPUs), and so on. The computing functionality 1302 can also include any storage resources (also referred to as computer-readable storage media or computer-readable storage medium devices) 1306 for storing any kind of information, such as machine-readable instructions, settings, data, etc. Without limitation, for instance, the storage resources 1306 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1302. The computing functionality 1302 may perform any of the functions described above when the hardware processor device(s) 1304 carry out computer-readable instructions stored in any storage resource or combination of storage resources. For instance, the computing functionality 1302 may carry out computer-readable instructions to perform each block of the processes (802, 902, 1002, 1102, 1202) described in Section B. The computing functionality 1302 also includes one or more drive mechanisms 1308 for interacting with any storage resource, such as a hard disk drive mechanism, an optical disk drive mechanism, and so on.

The computing functionality 1302 also includes an input/output component 1310 for receiving various inputs (via input devices 1312), and for providing various outputs (via output devices 1314). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1316 and an associated graphical user interface presentation (GUI) 1318. For instance, the computing functionality 1302 can present any mixed reality experience on the display device 1316. The display device 1316 may correspond to a charge-coupled display device, a cathode ray tube device, a projection mechanism, etc. Other output devices include a printer, a voice-based output system in conjunction with one or more speakers, a haptic output mechanism, an archival mechanism (for storing output information), and so on. The computing functionality 1302 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area computer network, a wide area computer network (e.g., the Internet), point-to-point connections, etc., or any combination thereof. The communication conduit(s) 1322 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1302 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a companion computing device is described for interacting with a parent computing device. The companion computing device includes a companion interaction component configured to send data to and/or receive data from the parent computing device via a companion communication component. The companion computing device further includes at least one companion environment-sensing device configured to capture companion sensor information that describes an environment. Parent map information, provided by the parent computing device, is used to determine a current pose of the companion computing device, in conjunction with the companion sensor information. Further, the companion computing device and the parent computing device simultaneously interact with the environment to perform respective functions. Further, the parent map information represents features in the environment with reference to a world coordinate system shared by the companion computing device and the parent computing device.

According to a second aspect, the companion interaction component (according to the first aspect) is configured to receive the parent map information from the parent computing device. Further, the above-referenced at least one companion environment-sensing device includes: at least one companion camera for capturing companion image information that depicts the environment; and at least one companion inertial measurement unit for capturing companion movement information that represents movement of the companion computing device within the environment. The companion computing device further includes a companion tracking component configured to determine the current pose of the companion computing device within the environment based on the parent map information, the companion image information and the companion movement information, to provide companion pose information.

According to a third aspect, the companion interaction component (according to the second aspect) is configured to receive new instances of the parent map information from the parent computing device on a periodic and/or event-driven basis.

According to a fourth aspect, wherein the companion interaction component (according to the second aspect) is configured to transfer the companion pose information to the parent computing device. Further, the parent computing device is configured to control a user experience based on the companion pose information.

According to a fifth aspect, the parent computing device (according to the first aspect) is further configured to produce a presentation that includes a virtual object within the world coordinate system, from a vantage point of a current pose of the parent computing device identified by the parent computing device. Further, the companion computing device is configured to produce a presentation that includes the virtual object within the world coordinate system, from a vantage point of the current pose of the companion computing device.

According to a sixth aspect, the companion computing device (according to the fifth aspect) is also configured to control the virtual object in response to a control action performed by a user.

According to a seventh aspect, the companion computing device (according to the first aspect) further includes a companion map-building component configured to build companion map information that represents the environment based on the companion sensor information. The companion interaction component is configured to transfer the companion map information to the parent computing device, and the parent computing device is configured to integrate the companion map information with the parent map information, with reference to the world coordinate system.

According to an eighth aspect, in the companion computing device (according to the seventh aspect), the companion interaction component is configured to receive an instance of the parent map information from the parent computing device. Further, the companion map-building component is configured to integrate the instance of the parent map information with the companion map information.

According to a ninth aspect, in the companion computing device (according to the first aspect), the above-referenced at least one companion environment-sensing device includes at least one companion camera for capturing companion image information that depicts the environment. Further, the companion interaction component is configured to transfer the companion image information to the parent computing device. Further, the parent computing device is configured to determine the current pose of the companion computing device based on the parent map information and the companion image information.

According to a tenth aspect, a system is described for interacting with an environment. The system includes a parent computing device and at least one companion computing device. The parent computing device includes: at least one parent camera for capturing parent image information that depicts the environment; at least one parent inertial measurement unit for capturing parent movement information, the parent movement information representing movement of the parent computing device within the environment; a parent map-building component configured to build parent map information that represents the environment based at least on the parent image information, wherein the parent map information represents features in the environment with reference to a world coordinate system; a parent tracking component configured to track a pose of the parent computing device within the environment based on the parent map information, the parent image information and the parent movement information; and a parent interaction component configured to send data to and/or receive data from a companion computing device via a parent communication component. The companion computing device includes a companion interaction component configured to send data to and/or receive data from the parent computing device via a companion communication component. Overall, the system leverages the same parent map information to determine a current pose of the companion computing device. Further, the companion computing device and the parent computing device simultaneously interact with the environment to perform respective functions.

According to an eleventh aspect, in the system (according to the tenth aspect), the companion interaction component is configured to receive the parent map information from the parent computing device. The companion computing device further includes: at least one companion camera for capturing companion image information that depicts the environment; at least one companion inertial measurement unit for capturing companion movement information that represents movement of the companion computing device within the environment; and a companion tracking component configured to determine the current pose of the companion computing device within the environment based on the parent map information, the companion image information and the companion movement information, to provide companion pose information.

According to a twelfth aspect, in the system (according to the tenth aspect), the companion computing device further includes a companion map-building component configured to build companion map information that represents the environment based at least on companion image information collected by the companion computing device. The companion interaction component is configured to transfer the companion map information to the parent computing device, and the parent computing device is configured to integrate the companion map information with the parent map information, with reference to the world coordinate system.

According to a thirteenth aspect, the system (according to the tenth aspect), includes two or more companion computing devices which interact with the parent computing device, with reference to the parent map information.

According to a fourteenth aspect, a method is described for using a companion computing device to interact with a parent computing device. The method includes: capturing companion sensor information, from at least one companion environment-sensing device, that describes an environment; and applying the companion sensor information, in conjunction with parent map information, to identify a current pose of the companion computing device. The parent map information is provided by the parent computing device. The companion computing device and the parent computing device simultaneously interact with the environment to perform respective functions. Further, the parent map information represents features in the environment with reference to a world coordinate system shared by the companion computing device and the parent computing device.

According to a fifteenth aspect, the above-referenced at least one companion environment-sensing device (of the fourteen aspect) includes: at least one companion camera for capturing companion image information that depicts the environment; and at least one companion inertial measurement unit for capturing companion movement information that represents movement of the companion computing device within the environment. The method (according to the fourteenth aspect) further includes, at the companion computing device: receiving parent map information from the parent computing device; and determining the current pose of the companion computing device within the environment based on the parent map information, the companion image information and the companion movement information, to provide companion pose information.

According to a sixteenth aspect, the above-referenced receiving map information (of the fifteen aspect) includes receiving new instances of the parent map information from the parent computing device on a periodic and/or event-driven basis.

According to a seventeenth aspect, the method (of the fourteenth aspect) further includes, at the companion computing device, producing a presentation that includes a virtual object within the world coordinate system, from a vantage point of the current pose of the companion computing device. The virtual object is further viewable by the parent computing device from a vantage point of a current pose of the parent computing device identified by the parent computing device.

According to an eighteenth aspect, the method of (of the fourteenth aspect), further includes, at the companion computing device: building companion map information that represents the environment based at least on the companion sensor information; and transferring the companion map information to the parent computing device. The parent computing device is configured to integrate the companion map information with the parent map information, with reference to the world coordinate system.

According to a nineteenth aspect, the method (of the eighteenth aspect) further includes, at the companion computing device: receiving an instance of the parent map information from the parent computing device; and integrating the instance of the parent map information with the companion map information.

According to a twentieth aspect, in the method (of the fourteenth aspect), the above-referenced at least one companion environment-sensing device includes at least one companion camera for capturing companion image information that depicts the environment. The method further includes transferring, by the companion computing device, the companion image information to the parent computing device. The parent computing device is configured to determine the current pose of the companion computing device based on the parent map information and the companion image information.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A companion computing device, comprising:
   at least one companion environment-sensing device configured to capture companion sensor information that describes a local environment in which the companion computing device and a parent computing device are located;
   a processing device; and
   a storage resource storing machine-readable instructions which, when executed by the processing device, cause the processing device to:
   send the companion sensor information to the parent computing device; and
   receive, from the parent computing device, a current pose of the companion computing device determined by the parent computing device,
   wherein the companion computing device and the parent computing device are configured to perform respective functions with respect to the local environment in which the companion computing device and the parent computing device are located, and
   wherein the parent computing device determines the current pose of the companion computing device using parent map information representing features in the local environment with reference to a world coordinate system shared by the companion computing device and the parent computing device.

2. The companion computing device of claim 1, wherein said at least one companion environment-sensing device includes:
   at least one companion camera configured to capture companion image information that depicts the local environment; and
   at least one companion inertial measurement unit configured to capture companion movement information that represents movement of the companion computing device within the local environment.

3. The companion computing device of claim 1, wherein the companion computing device lacks a tracking component for tracking a location of the companion computing device in the local environment.

4. The companion computing device of claim 1, wherein the companion computing device lacks a map-building component for building map information representing the local environment.

5. The companion computing device of claim 1, wherein the machine-readable instructions, when executed by the processing device, cause the processing device to:
   produce a presentation that includes a virtual object within the world coordinate system, the presentation being shown from a vantage point of the current pose of the companion computing device as determined by the parent computing device.

6. The companion computing device of claim 1, wherein the machine-readable instructions, when executed by the processing device, cause the processing device to:
when a control action manipulates the current pose of the companion computing device, control a virtual object based at least on the current pose.

7. The companion computing device of claim 1, wherein the parent computing device is a head-mounted display and the companion computing device is a custom hand-held controller designed for use with the head-mounted display.

8. The companion computing device of claim 7, wherein the machine-readable instructions, when executed by the processing device, cause the processing device to:
send the companion sensor information from the custom hand-held controller to the head-mounted display over a local wireless connection; and
receive the current pose of the custom hand-held controller from the head-mounted display over the local wireless connection.

9. The companion computing device of claim 1, wherein the at least one companion environment-sensing device comprises a wide field-of-view red-green-blue camera.

10. A system for interacting with a local environment, the system comprising:
a parent computing device located in the local environment; and
a companion computing device located in the local environment,
the parent computing device including:
at least one parent camera configured to capture parent image information that depicts the local environment;
a parent processing device configured to:
build parent map information that represents the local environment based at least on the parent image information, the parent map information representing features in the local environment with reference to a coordinate system;
receive companion image information depicting the local environment from the companion computing device;
based at least on the parent map information and the companion image information, determine a pose of the companion computing device; and
send the pose of the companion computing device from the parent computing device to the companion computing device; and
the companion computing device including:
at least one companion camera configured to capture the companion image information; and
a companion processing device configured to:
send the companion image information to the parent computing device; and
receive, from the parent computing device, the pose of the companion computing device
the companion computing device and the parent computing device being configured to perform respective functions with respect to the local environment in which the companion computing device and the parent computing device are located.

11. The system of claim 10, wherein the companion processing device is further configured to:
present a mixed-reality scene of the local environment on a screen of the companion computing device, the mixed-reality scene representing a virtual object from a vantage point of the pose of the companion computing device as determined by the parent computing device.

12. The system of claim 11, wherein the parent processing device is further configured to:
based at least on the parent map information and the parent image information, determine a pose of the parent computing device; and
present another mixed-reality scene of the local environment using a display mechanism of the parent computing device, the another mixed-reality scene representing the virtual object from a vantage point of the pose of the parent computing device.

13. The system of claim 12, wherein the companion computing device is a handheld computing device and the parent computing device is a head-mounted display.

14. A method comprising:
obtaining companion sensor information describing a local environment as captured by at least one companion-environment sensing device of a companion computing device;
applying the companion sensor information, in conjunction with parent map information determined by a parent computing device in the local environment, to identify a current pose of the companion computing device; and
sending the current pose of the companion computing device to the companion computing device over a local wireless connection,
the companion computing device and the parent computing device being configured to perform respective functions with respect to the local environment, and
the parent map information representing features in the local environment with reference to a coordinate system shared by the companion computing device and the parent computing device.

15. The method of claim 14,
wherein the companion sensor information comprises image information captured by a camera of the companion computing device.

16. The method of claim 14, further comprising:
obtaining parent sensor information describing the local environment as captured by at least one parent-environment sensing device of the parent computing device; and
determining a current pose of the parent computing device based at least on the parent map information and the parent sensor information.

17. The method of claim 16, further comprising:
producing a presentation that includes a virtual object within the coordinate system from a vantage point of the current pose of the parent computing device.

18. The method of claim 17, wherein the virtual object corresponds to a graphical object displayed on a screen of the parent computing device.

19. The method of claim 17, further comprising:
receiving user input directed to the virtual object; and
manipulating the virtual object responsive to the user input.

20. The method of claim 14, performed by the parent computing device.

* * * * *